United States Patent
Okubo

Patent Number: 6,122,406
Date of Patent: Sep. 19, 2000

[54] IMAGE PROCESSING DEVICE

[75] Inventor: Hiromi Okubo, Kanagawa, Japan

[73] Assignee: Ricoh Company, Ltd., Tokyo, Japan

[21] Appl. No.: 09/035,263

[22] Filed: Mar. 5, 1998

[30] Foreign Application Priority Data

Mar. 10, 1997 [JP] Japan .................................. 9-072621

[51] Int. Cl.[7] .................................................. G06T 5/20
[52] U.S. Cl. ......................... 382/261; 382/277; 382/274
[58] Field of Search .................................. 382/261, 260,
382/262, 263, 264, 265, 274, 298, 277;
358/445, 446, 261, 451, 455, 494, 497,
483, 482

[56] References Cited

U.S. PATENT DOCUMENTS

| | | | |
|---|---|---|---|
| 4,827,433 | 5/1989 | Kamon | 358/296 |
| 4,969,051 | 11/1990 | Sasaki | 358/447 |
| 4,979,129 | 12/1990 | Okubo et al. | |
| 5,410,619 | 4/1995 | Fujisawa et al. | |
| 5,835,630 | 11/1998 | Schweid et al. | 382/173 |
| 5,857,037 | 1/1999 | Saotome et al. | 382/264 |
| 5,982,947 | 11/1999 | Hayashi | 382/274 |

*Primary Examiner*—Scott Rogers
*Assistant Examiner*—Joel Sebastian Shaughnessy
*Attorney, Agent, or Firm*—Oblon, Spivak, McClelland, Maier & Neustadt, P.C.

[57] ABSTRACT

An image processing device of the present invention includes a photoelectric transducing section for transforming input image information to an electric signal. An analog-to-digital converter converts the electric signal to a digital signal. An image processing section for processing the digital signal has a shading correcting section, a filtering section, a magnification changing section, a gamma correcting section, and a tonality processing section. The filtering section is capable of selecting a particular filter intensity for each of two perpendicular directions in accordance with a desired magnification change ratio. The device is capable of varying an MTF (Modulation Transfer Function) characteristic in the subscanning direction in accordance with a magnification change ratio with simple hardware.

7 Claims, 6 Drawing Sheets

C1ij

| 0 | 0 | 0 | 0 | 0 |
|---|---|---|---|---|
| 0 | 0 | 0 | 0 | 0 |
| -1/8 | -1/8 | -4/8 | -1/8 | -1/8 |
| 0 | 0 | 0 | 0 | 0 |
| 0 | 0 | 0 | 0 | 0 |

C2ij

| 0 | 0 | -1/8 | 0 | 0 |
|---|---|---|---|---|
| 0 | 0 | -1/8 | 0 | 0 |
| 0 | 0 | -4/8 | 0 | 0 |
| 0 | 0 | -1/8 | 0 | 0 |
| 0 | 0 | -1/8 | 0 | 0 |

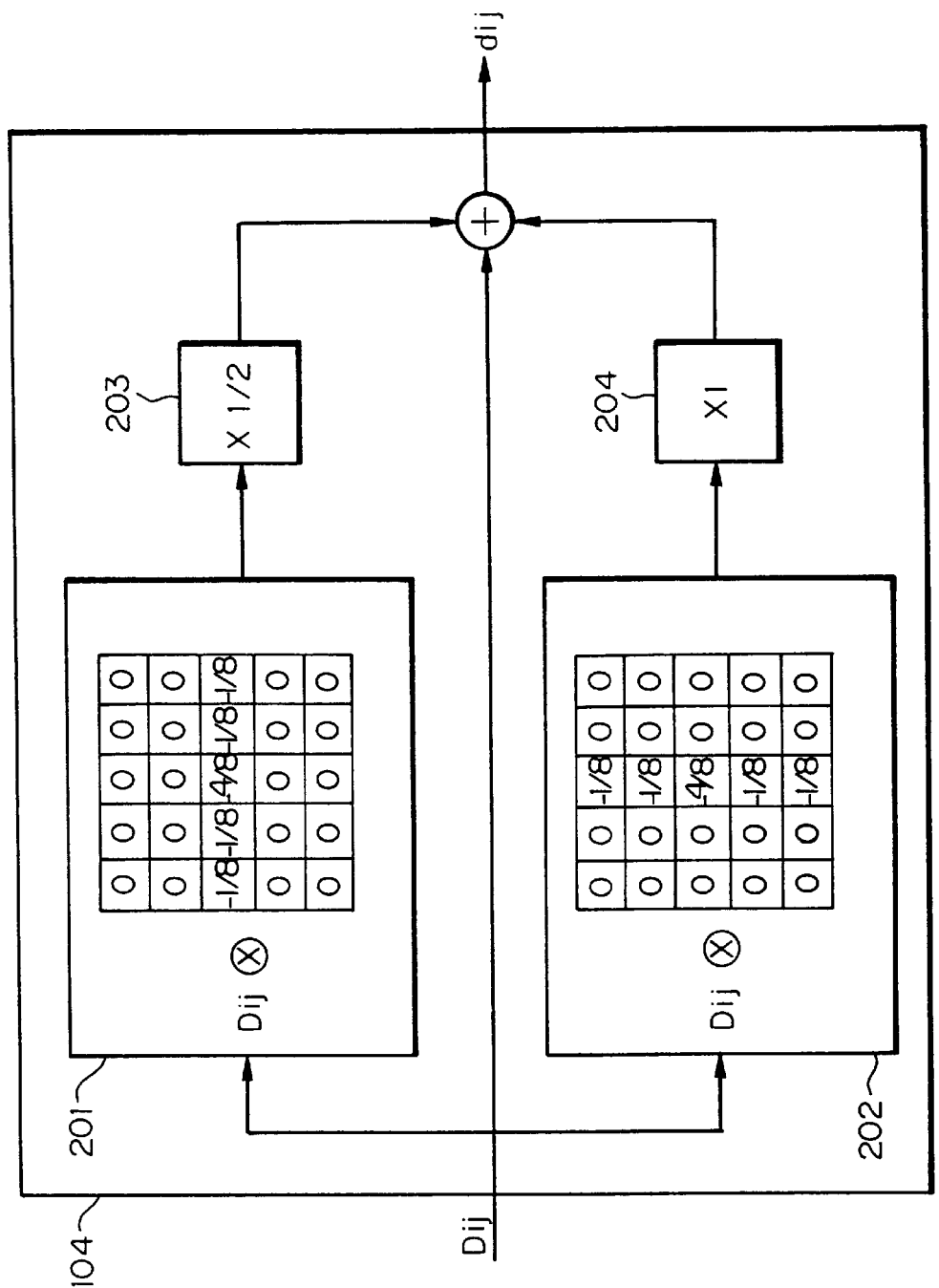

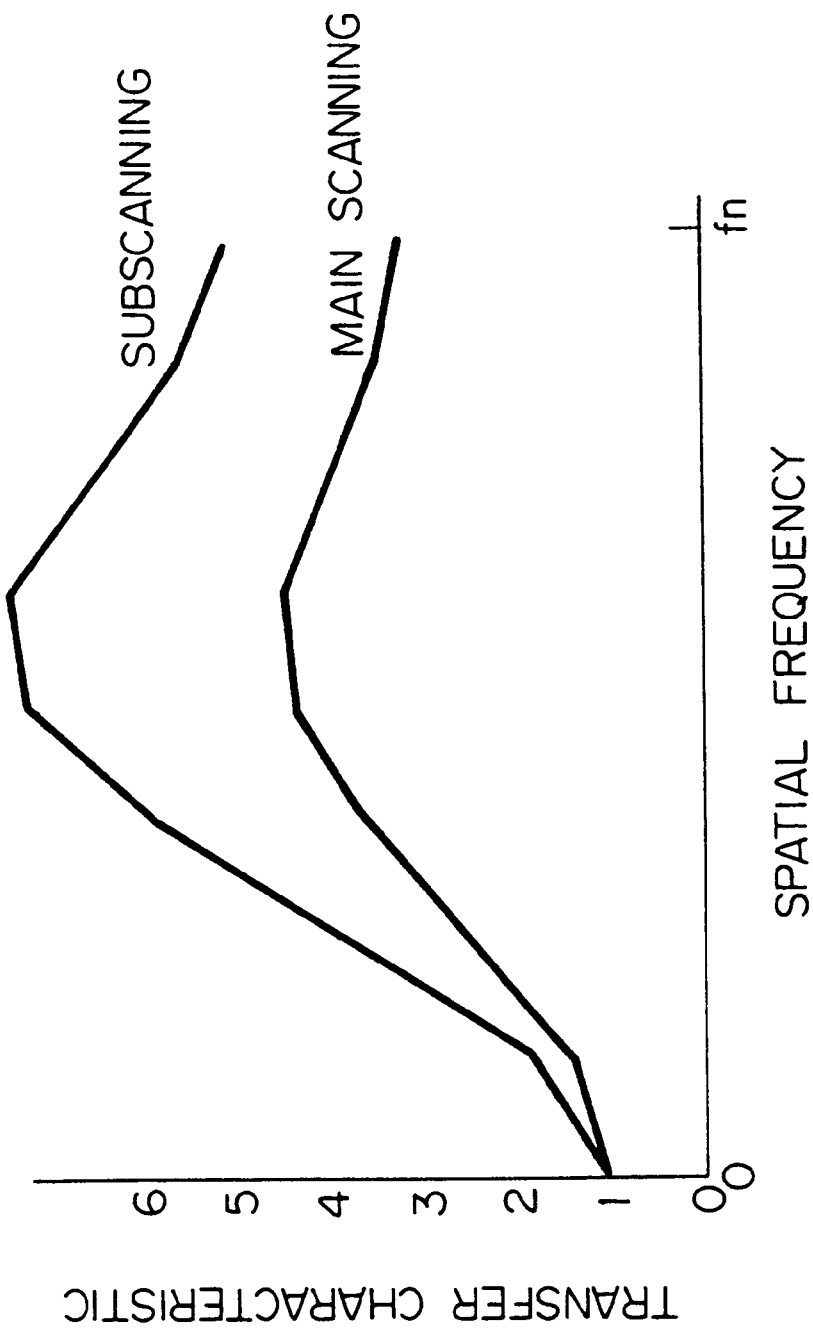

IMAGE PROCESSING DEVICE

BACKGROUND OF THE INVENTION

1. Field of the Invention

The present invention relates to an image processing device and, more particularly, to an image processing device including filtering means for enhancing image quality with an input image signal.

2. Discussion of the Background

Japanese Patent Laid-Open Publication No. 61-66472 discloses a filter having a smoothing circuit and an edge enhancing circuit connected in series. To render the degree of edges included in a pattern variable, the filter taught in this document smooths an image signal undergone shading correction, and again performs smoothing and edge enhancement with the smoothed signal so as to produce a linear sum.

The problem with the above conventional filter is that the degree of edge enhancement of characters and lines cannot be adjusted in the main and subscanning directions individually. Such a filter is not applicable to an image processing device of the type varying magnification in the subscanning direction by varying the running speed of the carriage of a scanner, unless the overall filer coefficient is replaced. Further, when it comes to a digital copier capable of varying magnification between 25% and 400%, the conventional filter must be provided with a plurality of filter coefficients, scaling up hardware.

SUMMARY OF THE INVENTION

It is therefore an object of the present invention to provide an image processing device capable of varying an MTF (Modulation Transfer Function) in the subscanning direction in accordance with a desired magnification change ratio with simple hardware.

An image processing device of the present invention includes a photoelectric transducing section for transforming input image information to an electric signal. An analog-to-digital converter converts the electric signal to a digital signal. An image processing section for processing the digital signal has a shading correcting section, a filtering section, a magnification changing section, a gamma correcting section, and a tonality processing section. The filtering section is capable of selecting a particular filter intensity for each of two perpendicular directions in accordance with a desired magnification change ratio.

BRIEF DESCRIPTION OF THE DRAWINGS

The above and other objects, features and advantages of the present invention will become apparent from the following detailed description taken with the accompanying drawings in which:

FIG. 10 shows a specific configuration of the filtering section for implementing 200% enlargement; and FIG. 11 shows a relation between the transfer characteristic and the spatial frequency to occur at the time of 200% enlargement.

DESCRIPTION OF THE PREFERRED EMBODIMENT

Figure 1:
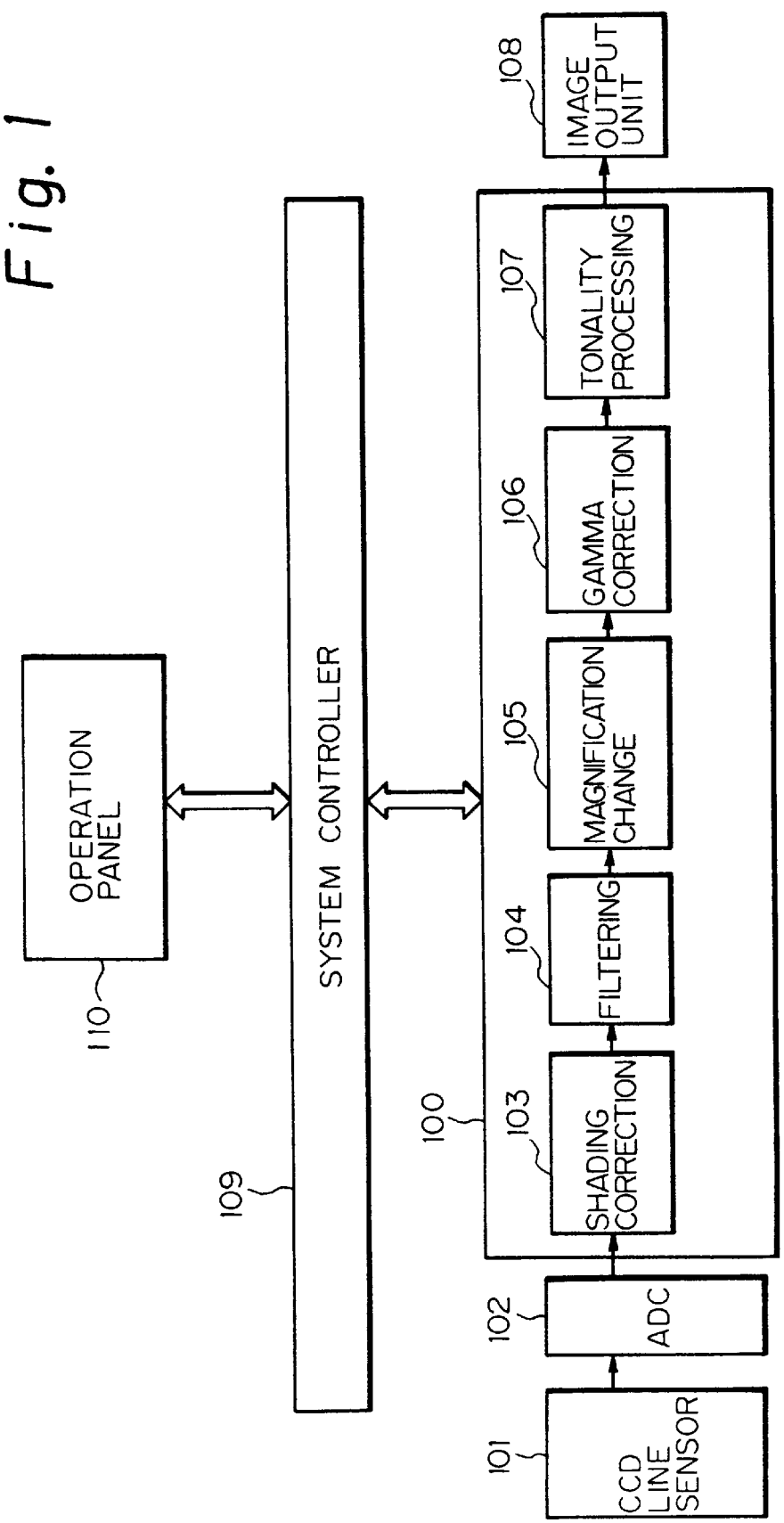
FIG. 1 is a block diagram schematically showing a digital copier including an image processing device embodying the present invention.

Referring to FIG. 1 of the drawings, an image processing device embodying the present invention is shown and applied to a digital copier by way of example. As shown, the digital copier includes a CCD (Charge Coupled Device) line sensor or photoelectric transducer 101 for reading an image out of a document and transforming it to an electric image signal. An analog-to-digital converter (ADC) 102 converts the electric signal to a digital signal. An image processing section is generally designated by the reference numeral 100. An image output unit 108 outputs an image. An operation panel 110 is accessible for inputting a desired magnification change ratio. A system controller 109 commands a filtering 104 included in the image processing section 100 to select a filter intensity and filter coefficients in accordance with the magnification change ratio. In addition, the system controller 109 sets parameters in various processing means constituting the image processing section 100.

The image processing section 100 has a shading correction 103, a magnification change 105, a gamma correction 106, and a tonality processing 107 in addition to the filtering 104. The shading correction 103 corrects irregularity in the optical sensitivities of pixels constituting the CCD line sensor 101 with respect to the digital image signal. The filtering 104 corrects the frequency deterioration of the input image signal. The magnification change 105 electrically changes the magnification in the direction in which the line sensor 101 extends. The gamma correction 106 removes the background of the input image signal. The tonality processing 107 matches the tonality of the image to the characteristic of the image output unit 108.

Figure 2:
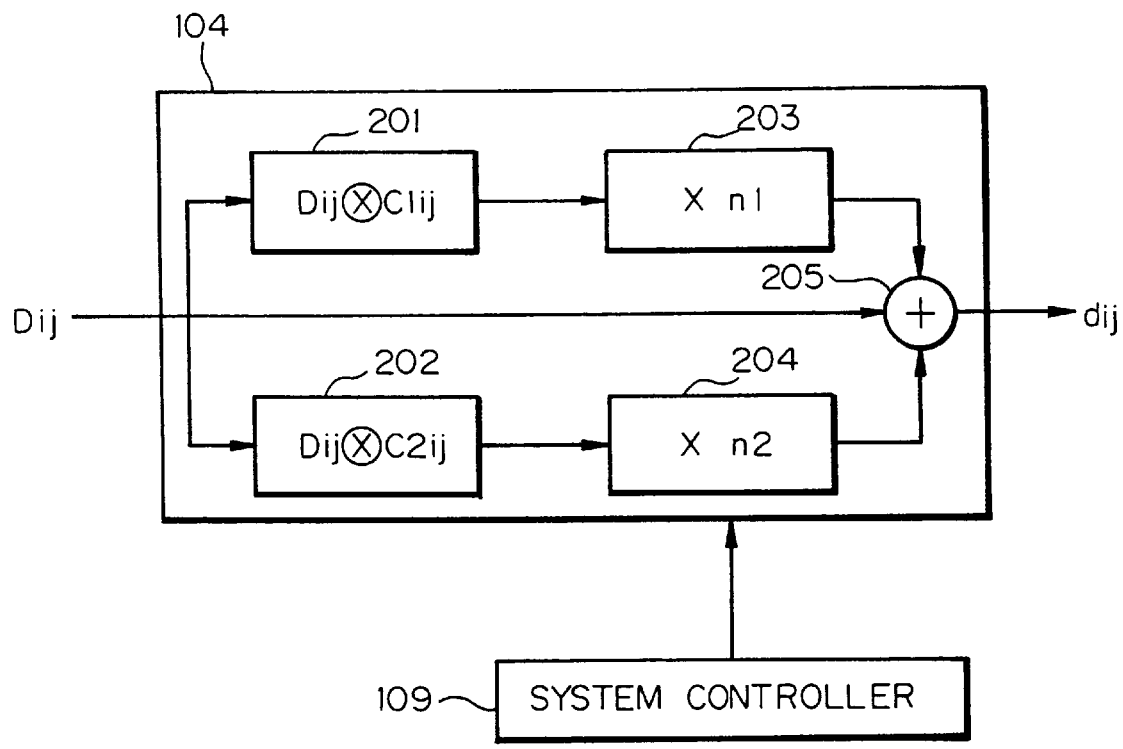
FIG. 2 shows a specific configuration of a filtering section included in the illustrative embodiment.

FIG. 2 shows the filtering 104 in detail. As shown, the filtering 104 includes product sum circuits 201 and 202 to which filter coefficients C1ij and C2ij are respectively assigned. The product sum circuits 201 and 202 perform convolution with the output Dij of the shading correcting means 103 by using the filter coefficients C1ij and C2ij, respectively. The filter coefficients C1ij and C2ij are respectively used to adjust the transfer characteristic in the main scanning direction and the transfer characteristic in the subscanning direction.

The outputs of the product sum circuits 201 and 202 are respectively input to multipliers 203 and 204. The multiplier 203 multiplies the output of the product sum circuit 201 by n1 while the multiplier 204 multiplies it by n2. An adder 205 adds the resulting products output from the multipliers 203 and 204 and the output Dij of the shading correction 103. A sum dij output from the adder 205 is fed out as the output of the filtering 104. The system controller 109 varies the filter coefficients C1ij and C2ij and multipliers n1 and n2 in accordance with a magnification change ratio input on the operation panel 110 (FIG. 1).

Figure 3:
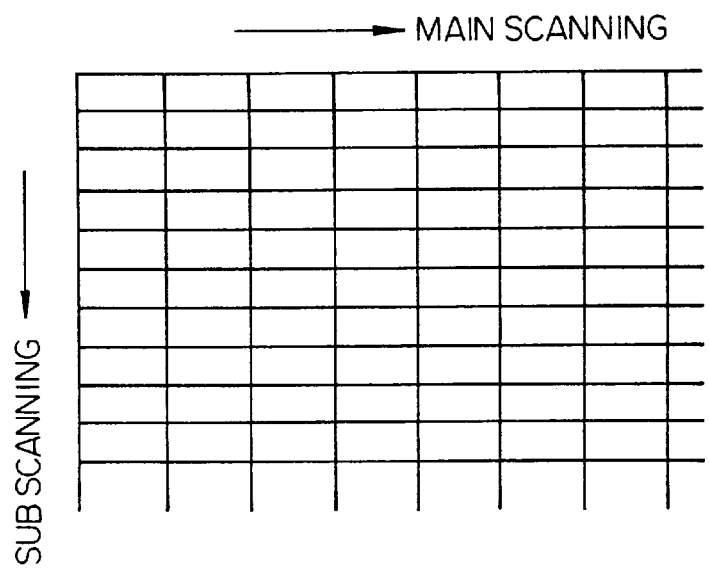
FIG. 3 shows the size of pixels sampled in an enlargement mode.

FIGS. 3–6 demonstrate how the illustrative embodiment reads a document and changes the magnification in an enlargement mode. Assume that the image of a document should be enlarged by 200%. Then, the image is sampled at the pitch of the line sensor 101 in the main scanning direction. As for the subscanning direction, the feed speed of the document relative to the line sensor 101 is halved. Synchronizing signals for reading the document are maintained the same as in an equisize mode. As a result, as shown in FIG. 3, the pixels are sampled in a size which is twice greater in the main scanning direction than in the subscanning direction.

Figure 4:
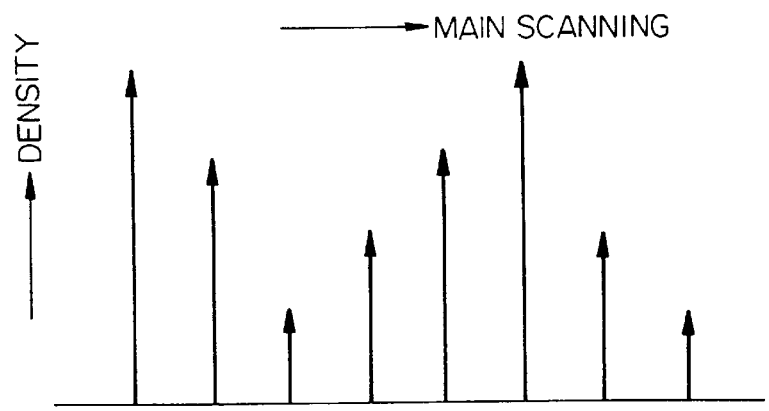
FIG. 4 shows specific signals sampled in the main scanning direction in the enlargement mode.
Figure 5:
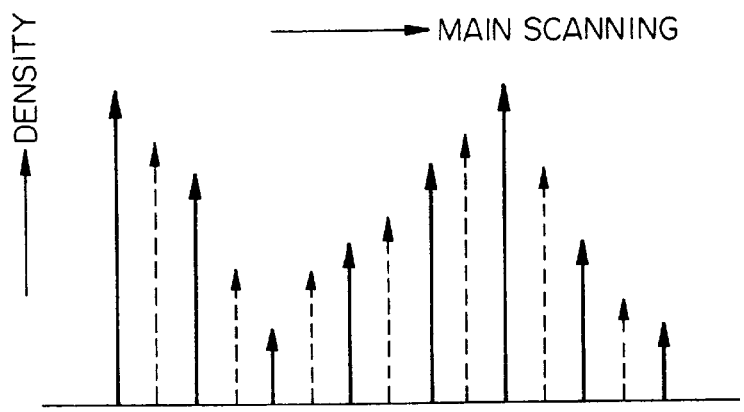
FIG. 5 shows virtual signals added to the signals shown in FIG. 4.
Figure 6:
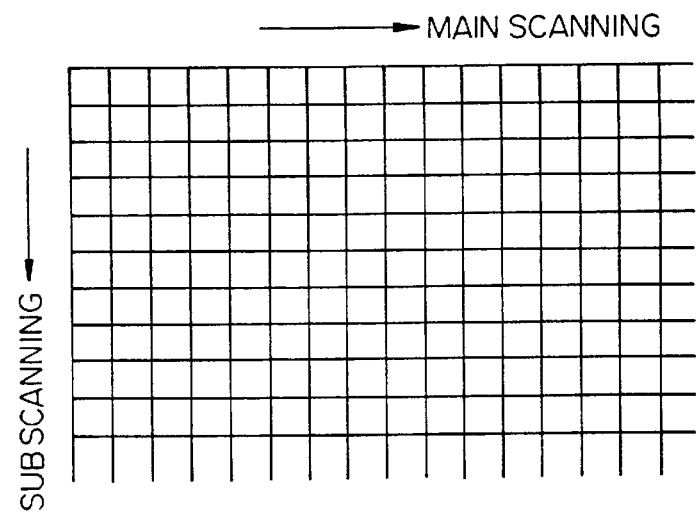
FIG. 6 shows the size of pixels resulting from the processing of FIG. 5.

FIG. 4 shows specific sampled signals appearing in the main scanning direction. The magnification change 105 produces, based on the sampled signals of FIG. 4, virtual signals indicated by dotted lines in FIG. 5, thereby electrically enlarging the image in the main scanning direction. FIG. 6 shows the resulting signal enlarged by 200% in both of the main and subscanning directions.

Figures 7, 8, 9:
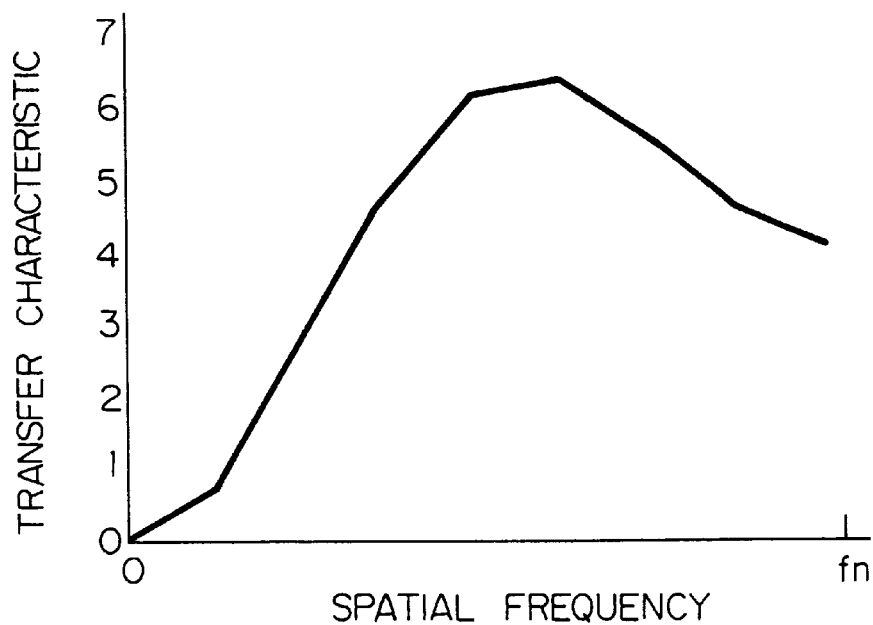
FIGS. 7 and 8 each shows specific filter coefficients assigned to the filtering section.
FIG. 9 is a graph showing a relation between a transfer characteristic derived from the filter coefficients and the spatial frequency.

FIGS. 7 and 8 respectively show specific filter coefficients C1ij and specific filter coefficients C2ij assigned to the filtering 104 (FIG. 2). FIG. 9 is a graph showing a relation between the spatial frequency and the filter transfer characteristic derived from each of the filter coefficients C1ij and C2ij. Labeled fn on the abscissa is the Nyquist frequency. Although the transfer characteristic relates to the main scanning direction for the filter coefficients C1ij or relates to the subscanning direction for the filter coefficients C2ij, it has the same intensity in both of the main and subscanning directions.

FIG. 10 shows a specific configuration of the filtering 104 for implementing 200% enlargement. Because the filtering 104 precedes the magnification change 105 with respect to the flow of the signal, it processes the image signal whose sampling frequency differs from the main scanning direction to the subscanning direction, as shown in FIG. 3. In light of this, the filtering 104 makes the transfer characteristic in the main scanning direction less intense than the transfer characteristic in the subscanning direction. Specifically, the system controller 109 (FIG. 1) sets a multiplier of ½ and a multiplier of 1 in the multipliers 203 and 304, respectively. Consequently, the transfer characteristic between the input Dij and the output dij of the filtering 104 is smaller in the main scanning direction than in the subscanning direction, as shown in FIG. 11.

In a reduction mode, the transfer characteristic in the main scanning direction is made greater than the transfer characteristic in the subscanning direction. For this purpose, the system controller 109 sets a greater multiplier in the multiplier 203 than in the multiplier 204 while maintaining the specific filter coefficients shown in FIG. 10.

In summary, it will be seen that the present invention provides an image processing device capable of optimizing the MTF characteristic in the subscanning direction in accordance with a desired magnification change ratio. This advantage is derived from the combination of a shading correcting section, a magnification changing section, a gamma correcting section, a tonality processing section, and a filtering section capable of selecting a particular filter intensity for each of two perpendicular directions in accordance with a magnification change ratio. Further, the filtering section makes, in a reduction mode, the MTF characteristic in the direction in which the carriage of a scanner moves less intense than the MTF characteristic in the direction in which a CCD line sensor extends, but makes, in an enlargement mode, the former more intense than the latter. This further enhances the optimization of the MTF characteristic in the subscanning direction.

Various modifications will become possible for those skilled in the art after receiving the teachings of the present disclosure without departing from the scope thereof.

What is claimed is:

1. An image processing device comprising:
   photoelectric transducing means for transducing input image information to an electric signal;
   analog-to-digital converting means for converting the electric signal to a digital signal; and
   image processing means for processing the digital signal;
   said image processing means comprising shading correcting means, filtering means, magnification changing means, gamma correcting means, and tonality processing means, wherein said filtering means includes first and second product sum circuits with respective first and second filter coefficients and first and second multipliers receiving outputs of said respective first and second product sum circuits for respective of two perpendicular directions, and wherein said first and second multipliers change in accordance with a magnification change ratio.

2. A device as claimed in claim 1, wherein the two perpendicular directions are respectively a direction in which a CCD image sensor extends and a direction in which a carriage of a scanner is movable.

3. A device as claimed in claim 2, wherein said magnification changing means changes a magnification by varying a speed at which the carriage moves.

4. A device as claimed in claim 3, wherein said filtering means has an MTF characteristic based on said first and second filter coefficients and multipliers in the direction in which the carriage is movable made, in a reduction mode, less intense than an MTF characteristic based on said first and second filter coefficients and multipliers in the direction in which the CCD line sensor extends, but made, in an enlargement mode, more intense than said MTF characteristic in the direction in which the CCD line sensor extends.

5. A device as claimed in claim 2, wherein said filtering means has an MTF characteristic based on said first and second filter coefficients and multipliers in the direction in which the carriage is movable made, in a reduction mode, less intense than an MTF characteristic based on said first and second filter coefficients and multipliers in the direction in which the CCD line sensor extends, but made, in an enlargement mode, more intense than said MTF characteristic in the direction in which the CCD line sensor extends.

6. An image processing device comprising:
   photoelectric transducing means for transducing input image information to an electric signal;
   analog-to-digital converting means for converting the electric signal to a digital signal; and
   image processing means for processing the digital signal;
   said image processing means comprising shading correcting means, filtering means, magnification changing means, gamma correcting means, and tonality processing means, wherein said filtering means is capable of selecting a particular filter intensity for each of two perpendicular directions in accordance with a magnification change ratio, wherein the two perpendicular directions are respectively a direction in which a CCD image sensor extends and a direction in which a carriage of a scanner is movable, and wherein said filtering means has an MTF characteristic in the direction in which the carriage is movable made, in a reduction mode, less intense than an MTF characteristic in the direction in which the CCD line sensor extends, but made, in an enlargement mode, more intense than said MTF characteristic in the direction in which the CCD line sensor extends.

7. A device as claimed in claim 6, wherein said magnification changing means changes a magnification by varying a speed at which the carriage moves.

* * * * *